(12) United States Patent
Gangitano

(10) Patent No.: US 6,580,452 B1
(45) Date of Patent: Jun. 17, 2003

(54) SATELLITE SIGNAL LOSS ON-SCREEN NOTIFICATION

(75) Inventor: Greg Gangitano, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 962 days.

(21) Appl. No.: 08/811,827

(22) Filed: Mar. 5, 1997

(51) Int. Cl.⁷ .................. H04N 17/00; H04N 17/02; H04N 5/50

(52) U.S. Cl. .................. 348/180; 348/570; 348/569; 455/3.02; 725/72

(58) Field of Search .................. 455/3.2, 6.2, 6.3; 348/180, 184, 185, 192, 193, 10, 553, 563, 569, 570, 731; 725/72; H04N 7/16, 7/20

(56) References Cited

U.S. PATENT DOCUMENTS

| | | | | |
|---|---|---|---|---|
| 4,023,202 A | * | 5/1977 | Louie et al. | 348/169 |
| 4,553,838 A | * | 11/1985 | Madsen | 356/237.1 |
| 4,685,065 A | * | 8/1987 | Braun et al. | 702/76 |
| 4,785,291 A | * | 11/1988 | Hawthorne | 340/573 |
| 4,935,814 A | * | 6/1990 | Omoto et al. | 348/570 |
| 5,119,072 A | * | 6/1992 | Hemingway | 340/573 |
| 5,247,381 A | * | 9/1993 | Olmstead et al. | 359/118 |
| 5,493,310 A | * | 2/1996 | Ota | 343/760 |
| 5,495,283 A | * | 2/1996 | Cowe | 348/9 |
| 5,589,841 A | * | 12/1996 | Ota | 343/760 |
| 5,604,923 A | * | 2/1997 | Wilkus | 381/18 |
| 5,620,472 A | * | 4/1997 | Rahbari | 607/27 |
| 5,748,147 A | * | 5/1998 | Bickley et al. | 342/457 |
| 5,771,002 A | * | 6/1998 | Creek et al. | 340/539 |
| 5,784,633 A | * | 7/1998 | Petty | 395/880 |
| 5,825,407 A | * | 10/1998 | Cowe et al. | 348/6 |

* cited by examiner

Primary Examiner—John Miller
Assistant Examiner—Linus H. Lo
(74) Attorney, Agent, or Firm—Blakely, Sokoloff, Taylor & Zafman LLP

(57) ABSTRACT

An apparatus for displaying a received signal strength includes means for detecting a received signal strength of a signal received at an antenna. Coupled to the detecting means are means for automatically generating a display signal indicative of the received signal strength. The means for generating is configured to provide the display signal whenever the received signal strength is below a preset threshold. Coupled to the means for generating the display signal are means for displaying the display signal. The display signal may comprise a bar graph which is shaded according to the received signal strength. The bar graph is automatically displayed on the display means when the received signal strength is below the threshold.

8 Claims, 4 Drawing Sheets

SATELLITE SIGNAL LOSS ON-SCREEN NOTIFICATION

FIELD OF THE INVENTION

The present invention is related to home satellite receiving systems and, more particularly, to those systems which provide graphical or other on-screen indications or messages for users of such systems.

BACKGROUND

With the advent of direct broadcast satellite receiver systems in the home, proper alignment of a receiving antenna for operation of such receivers has become a concern. FIG. 1 illustrates the basic alignment problem facing the user of a home satellite receiver. An antenna associated with the receiving system must be aligned in azimuth so as to receive a signal broadcast by the satellite. Typically, this alignment is performed by a user who rotates the antenna in azimuth until receiving an indication that an acceptable signal strength is presented to the receiver system. As shown in FIG. 2, as the antenna is rotated in azimuth, there will come a time at which a peak signal strength for a received signal presented from the antenna to the receiver system is achieved. As the antenna is rotated further in azimuth, the signal strength falls off according to the degree of misalignment.

Optimally, a user will adjust the antenna for the home satellite receiving system so that the antenna points in a direction coincident with the peak signal strength. Current home receiver systems employ on-screen indicators, for example bar graphs, to assist in the alignment process. The bar graphs are shaded by an amount proportional to the received signal strength. Accordingly, the user adjusts the alignment of the antenna until the bar graph indicates optimal alignment. The bar graph display may also be used during reception to indicate a current received signal strength. Typically, however, a user must access the bar graph signal strength display through a series of on-screen menu options.

Other home satellite receiver system manufacturers have implemented similar signal strength meters which provide some visual indication of the received signal strength. These systems generally have the same short comings as the bar graph approach, namely that the signal strength meter or other visual display reference must be accessed through a series of menu options. In many cases this is impractical, because when a user first sets up a home satellite receiving system the user is not familiar with the menu options and must refer to an operator's manual for assistance. Thus, before the user can begin alignment of the antenna system, the user must read an often lengthy manual to learn how to display the signal strength indicator on an associated television set. Even after the initial installation, the user must execute a series of menu options to display the signal strength indicator, for example when picture quality has a degraded appearance.

It would be desirable, therefore, to provide an improved means for displaying received signal strength for a home satellite receiver system.

SUMMARY OF THE INVENTION

In one embodiment, the present invention provides an apparatus for displaying a received signal strength. The apparatus includes means for detecting a received signal strength of a signal received at an antenna. Coupled to the detecting means are means for automatically generating a display signal indicative of the received signal strength. The means for generating is configured to provide the display signal whenever the received signal strength is below a preset threshold. Coupled to the means for generating the display signal are means for displaying the display signal. The display signal may comprise a bar graph which is shaded according to the received signal strength. The bar graph is automatically displayed on the display means when the received signal strength is below the threshold.

BRIEF DESCRIPTION OF THE DRAWINGS

The present invention is illustrated by way of example, and not limitation, in the figures of the accompanying drawings in which.

DETAILED DESCRIPTION

A method and apparatus for automatically displaying a received signal strength is described. Although described with reference to certain specific embodiments, those skilled in the art will recognize that the present invention may be practiced without some or all of these details and, further, that the invention may be used in systems (such as direction finding aids) other than the home satellite television receiving system discussed below. The present invention improves the manner in which a user is notified of variations in received signal strength and/or a loss of received signal. In particular, in response to a variation in received signal strength, an on-screen signal strength indicator is automatically displayed. A user need not execute a series of menu options in order to access the signal strength indicator. In addition, in one embodiment, a signal strength indicator is automatically displayed if a home satellite television receiver recognizes that it is being activated for the first time.

Figure 1:
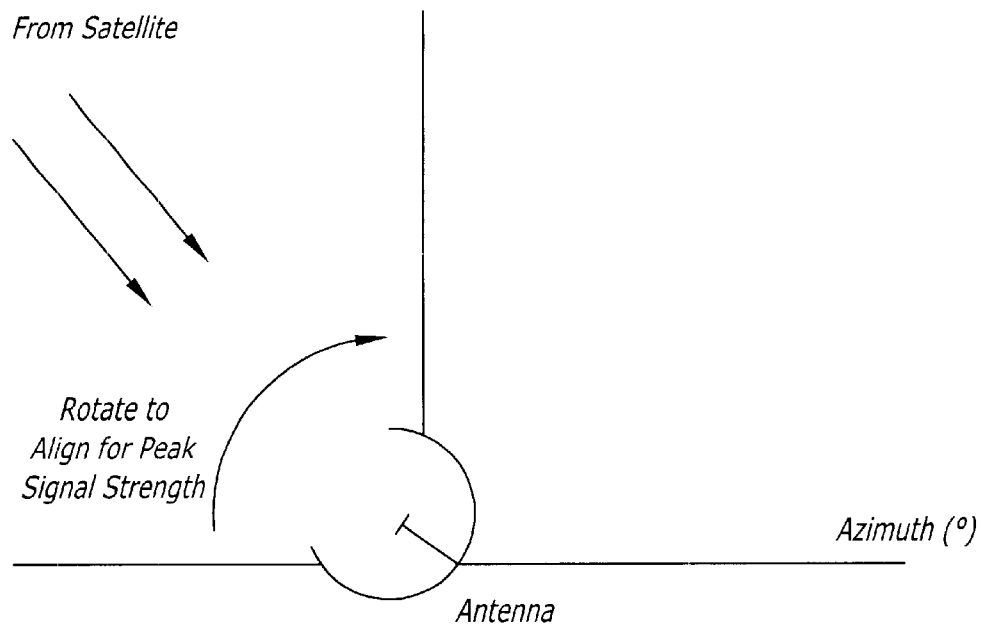
FIG. 1 illustrates the alignment of an antenna in azimuth.
Figure 2:
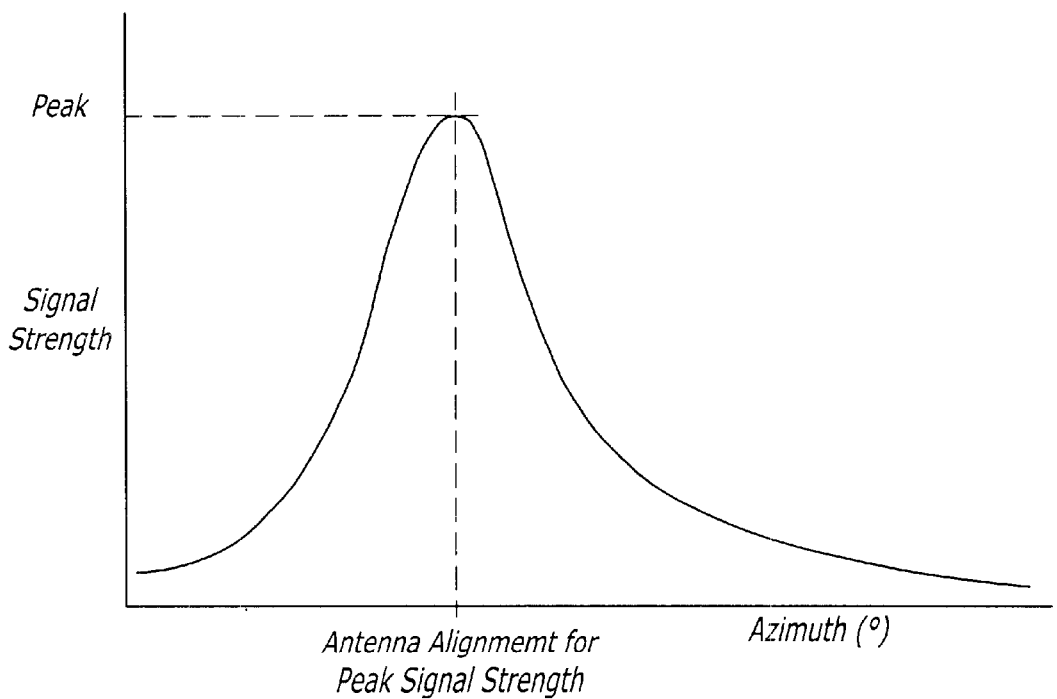
FIG. 2 illustrates a plot of received signal strength verses antenna position in azimuth.
Figure 3:
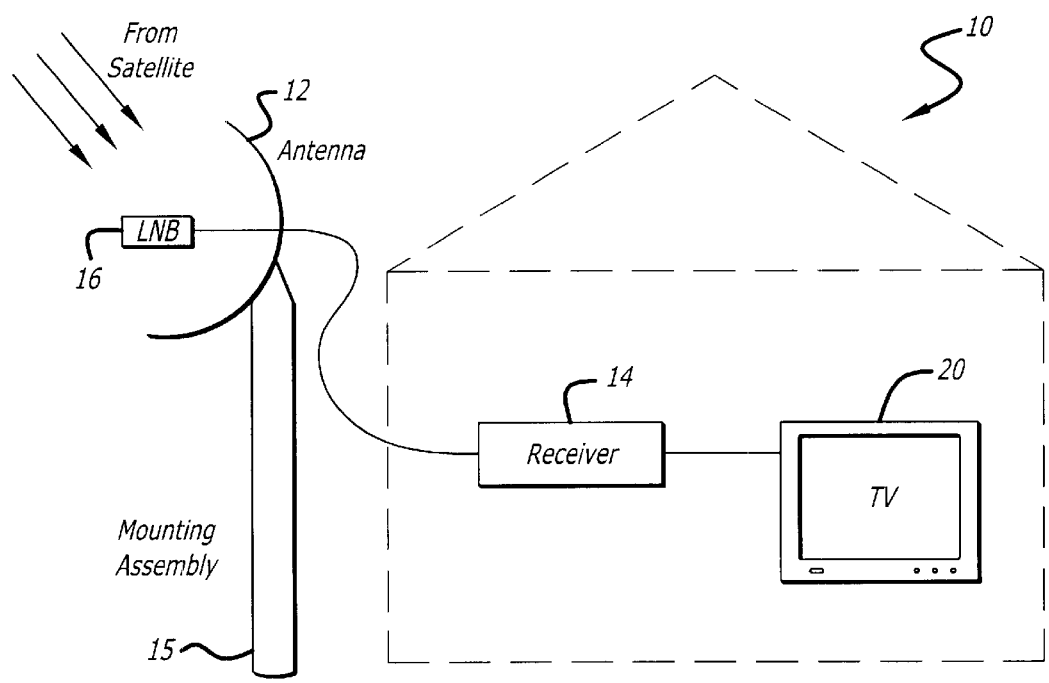
FIG. 3 illustrates a home satellite receiver system employing a signal strength detector and indicator according to one embodiment.

FIG. 3 illustrates a home satellite receiver system 10 which includes an antenna 12 coupled to a receiver 14. Antenna 12 is to be aligned so as to receive a signal broadcast by a satellite. When antenna 12 is aligned in an optimal position, the signal presented to receiver 14 from antenna 12 will have a maximum received signal strength. Antenna 12 is maintained in alignment through the use of mounting assembly 15 which may comprise a bracket fixed to a wall or other supporting structure or a pole fixed in the ground or another stable platform (e.g., a roof).

Receiver system 10 also incorporates a low noise Block Down Converter (LNB) 16. LNB 16 may be positioned near a feedhorn assembly (not shown) associated with antenna 12. Signals received by antenna 12 are focused to the feedhorn and passed to LNB 16 where they are amplified and downconverted prior to transmission to receiver 14. Such signals generally include audio and/or video information which is decoded by receiver 14. The decoded audio and/or video information is then presented to television (TV) 20 for display.

Figure 4:
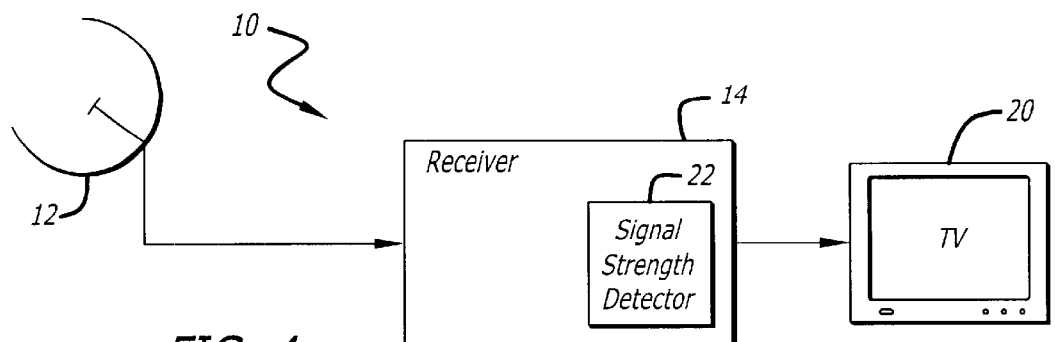
FIG. 4 illustrates one embodiment of a signal strength detector and indicator.

As illustrated in FIG. 4, receiver 14 may include a signal strength detector 22. Signal strength detector 22 is configured to sample the received signal presented from antenna 12 and determine a relative signal strength. Techniques for computing a signal strength are well known in the art and typically involve the computation of a time averaged measure of the magnitude of the received signal. In other embodiments, the signal strength detector 22 may be part of LNB 16 or may comprise a stand alone unit. Signal strength detector 22 generates a signal indicative of the relative strength of the received signal for later use.

Figure 5:
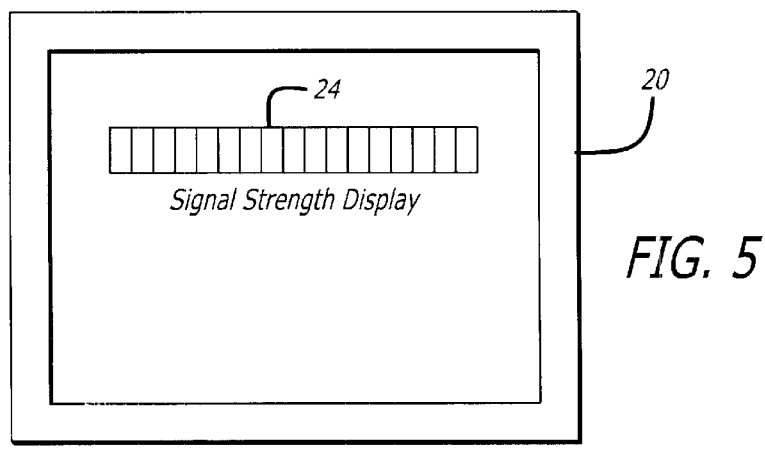
FIG. 5 illustrates the one possible signal strength display for use according to the present invention.

FIG. 5 shows one possible means of displaying the signal strength information generated by signal strength detector 22. In this example, the signal strength information is displayed as a bar graph on TV 20. It will be appreciated that in such an embodiment, the signal strength detector 22 generates a signal indicative of the received signal strength and that signal is subsequently converted to video information for display on TV 20. The video information is displayed as bar graph 24 at an appropriate location on TV 20 so as to provide a user with a visual representation of the received signal strength. During times when the received signal strength is relatively strong, bar graph 24 may be predominately lit. That is, more of the individual bars are shaded (e.g., with one or more colors) than are not shaded. As signal strength falls off (for example, as might occur during periods of increased solar activity, rain, snow, or during antenna alignment), fewer individual bars of the graph 24 will be lit. In this way, bar graph 24 may be used as a ready reference for indicating the relative received signal strength.

It should be recognized that bar graph 24 is merely one of a number of possible video presentations of the received signal strength which might be implemented. In other embodiments, bar graph 24 may be replaced by a display showing a number. Higher numbers may be used to indicate relatively strong signal strength while smaller numbers may be used to indicate weaker signal strength. In yet other embodiments, other indicators of relative received signal strength may be used. Accordingly, bar graph 24 is used merely to illustrate the principle of displaying a visual indicator for a user and should in no way limit the present invention.

As discussed above, as antenna 12 is moved in azimuth, a peak signal strength may be found and reported by signal strength detector 22. At such times, bar graph 24 may be completely (or nearly completely) lit. As antenna 12 continues be rotated in azimuth, received signal strength falls off from the peak and signal strength detector 22 reports the weaker signal strength. As a result, bar graph 24 will become predominantly unlit, indicating that the user has rotated the antenna beyond the position which provided maximum received signal strength.

Generally, signal strength displays such as bar graph 24 can only be accessed by users after executing a series of on-screen menu commands or after manipulation of one or more front panel controls. During the initial set up process of a home satellite television receiver system, this can be troublesome to an inexperienced user. Accordingly, the present invention provides that when receiver system 10 is being installed for the first time, bar graph 24 will be automatically displayed. In this way, a user will be provided with an immediate indication of the relative strength of the received signal to assist in properly aligning antenna 12.

In addition to being automatically displayed at initial set-up, bar graph 24 will also be automatically displayed whenever the received signal strength falls below an acceptable level to provide audio and/or video images to TV 20. Generally, when the received signal strength falls below an acceptable level, the video image displayed on TV 20 will freeze. If the signal strength returns to an acceptable level, the image will return to normal. With prior receiver systems, users were not automatically provided with any indication of why a video image suddenly froze on the screen of their television. As noted above, the cause could be any number of situations, including a severed cable between an antenna and a receiver, rain or other inclimate weather, sun spot activity or transmission problems originating at the satellite or the uplink station. In such systems, a user is forced to execute a series of menu commands (or push button commands) to display a signal strength indication which may help resolve the source of the problem. (For example, if a signal strength of zero were indicated, this may indicate that a cable break between the receiver and the antenna has occurred.) In order to provide a user with a visual indication of why a video image has suddenly frozen on the screen, the present invention provides that bar graph 24 (or another visual indicator) will be automatically displayed on TV 20 whenever the received signal strength has fallen below an acceptable level. The acceptable level for viewing may be preset or may be later programmed by a user. Generally, however, the signal level at which the bar graph 24 will be automatically displayed will be the same level at which the video image will freeze.

Figure 6A:
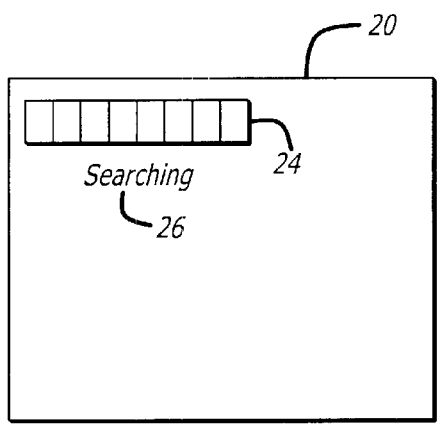
FIGS. 6a, 6b and 6c illustrate various signal strength displays for use according to the present invention.
Figure 6B:
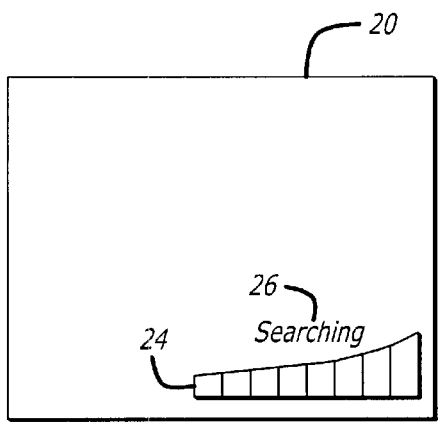
Figure 6C:
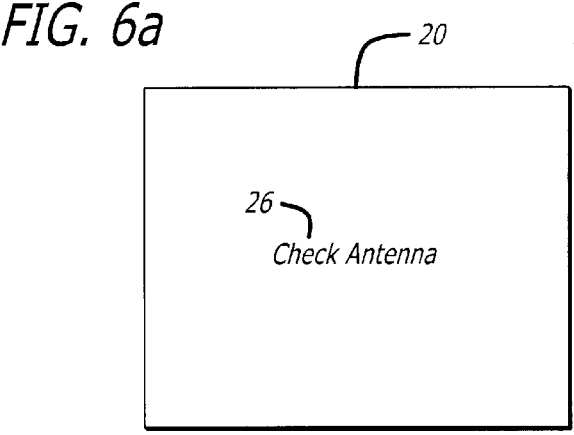

The bar graph 24 is generated in the same fashion as described above and may be superimposed over the frozen video image using video mixing techniques well known in the art. Alternatively, the bar graph 24 display may replace the frozen video image on the screen of TV 20. As illustrated in FIGS. 6a–6c, a variety of display options may be used. FIG. 6a shows one option where bar graph 24 is displayed in a corner of the TV 20 screen, preferably superimposed over a frozen video image. Notice further that along with bar graph 24, a text message 26 may be displayed. The text message 26 may alert the user as to the source of the problem. For example, if the receiver 14 still detects signals from antenna 14, but the signals are below an acceptable level, the receiver 14 may recognize that a connection still exists between it and antenna 14 and, thus, the problem is probably one of transmission (either due to weather conditions or some other factor). Thus, a text message 26 such as "Searching" may be displayed to indicate top the user that the receiver 14 is trying to acquire the satellite signal and that the problem does not exist with the user's antenna to receiver connection.

FIG. 6b illustrates an alternative display situation. In this case, bar graph 24 has a stylized appearance, with larger bar sections for use in indicating stronger received signal strength. As shown, this bar graph 24 may be accompanied by a text message 26 as before.

FIG. 6c illustrates a further variation, this time only a text message 26 is displayed. Such a situation may be used for those times when the receiver 14 no longer detects any signals arriving from antenna 12, this may indicate a problem with the user's receiver system 10 and so a text message 26 such as "Check Antenna" is displayed to alert the user that the problem may originate with his or her system 10, in all cases, the bar graph 24 and/or text message 26 is displayed automatically in response to receiver 14 detecting a loss of received signal strength. The user is no longer required to search through a variety of menu options or push button commands in order to have the information displayed.

Figure 7:
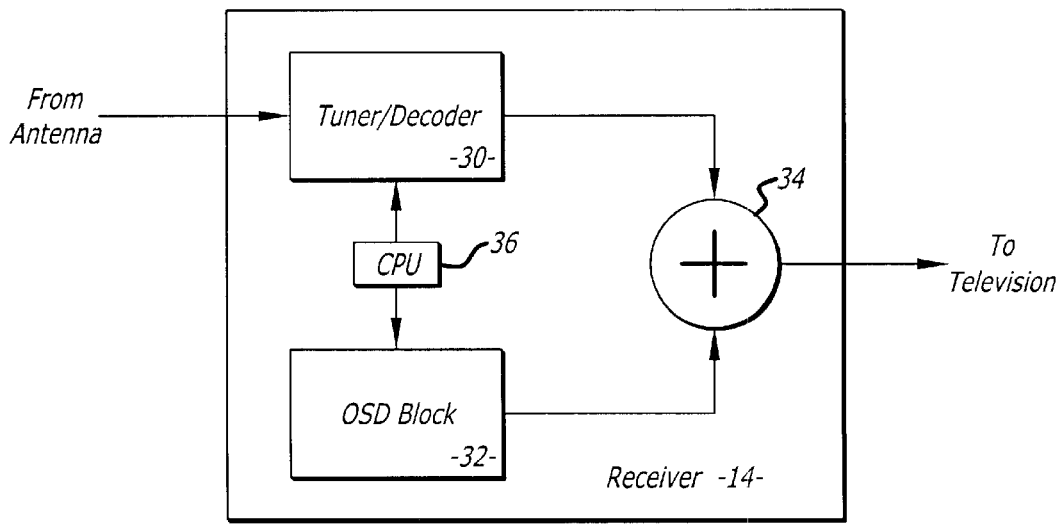
FIG. 7 illustrates a home satellite receiver configured according to one embodiment.

FIG. 7 illustrates one possible configuration of receiver 14. Signals from antenna 12 are provided to a tuner/decoder block 30 within receiver 14. Tuner/decoder 30 selects and decodes the desired portions of the signals provided by antenna 12 for processing into television signals (e.g., NTSC or PAL signals) for use by television 20. The processed signals may be combined with on-screen display data produced by on-screen display (OSD) block 32 in a mixer 34. The combined signals are then provided to TV 20.

Figure 8:
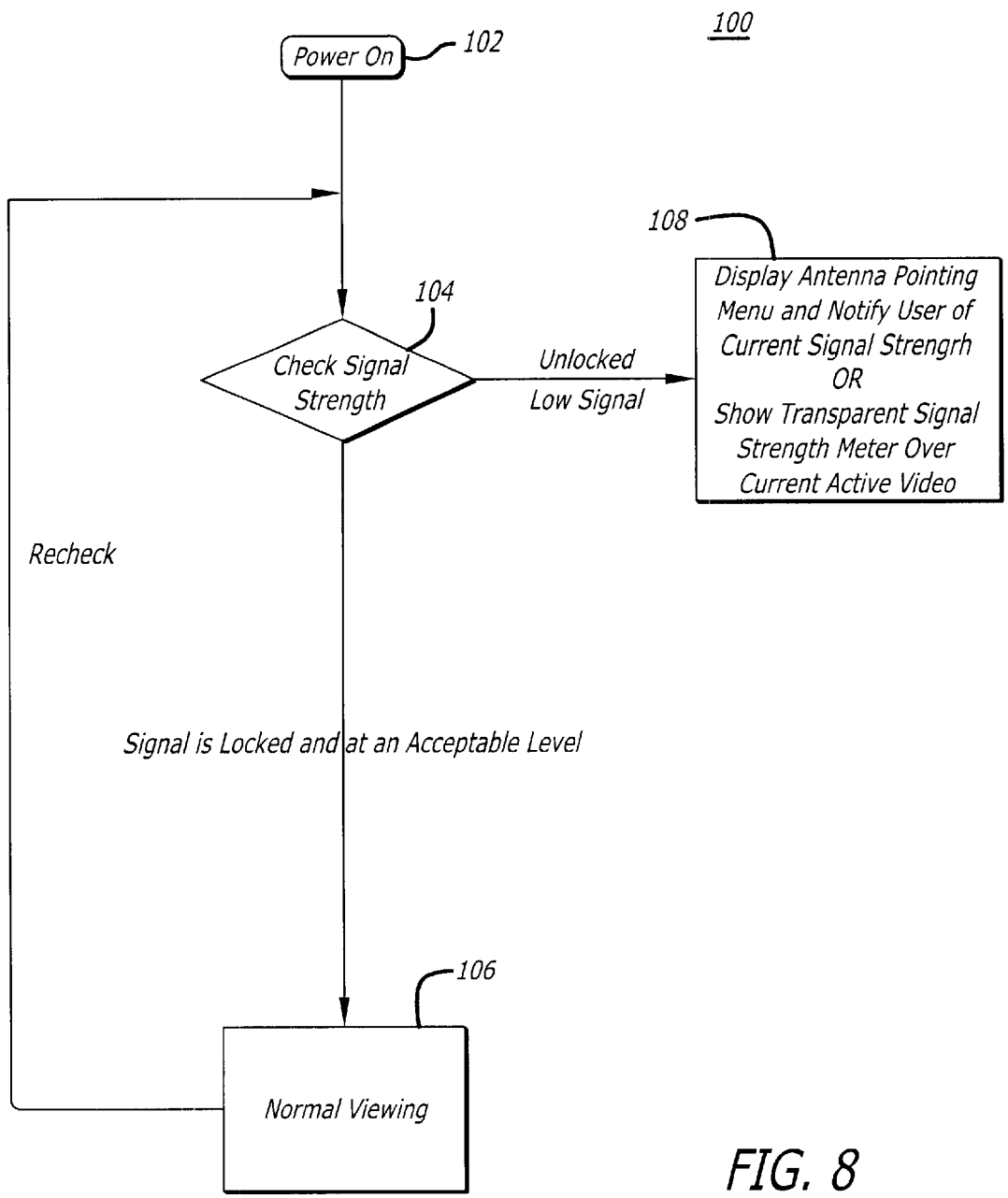
FIG. 8 is a flow diagram illustrating a signal strength display routine according to one embodiment.

OSD block 32 generates on-screen display data such as bar graph 24 and text messages 26 using techniques common in the art. The on-screen display information may be provided in response to commands from a processor (CPU) 36 which also controls the actions of tuner/decoder block 30. FIG. 8 illustrates one possible process to be executed by CPU 36 to control the display of on-screen information.

Process 100 begins at step 102 when power is supplied to receiver 14. At step 104, processor 36 performs the operations required to determine the relative signal strength of the signals received at receiver 14. It should be appreciated that the functions of signal strength detector 22 may be provided by elements of tuner/decoder 30 or by separate circuitry. In general, however, such information may be reported to CPU 36 which may be a general purpose programmable microprocessor or, in some cases, a field programmable gate array or complex programmable logic device configured in accordance with process 100. During ordinary operating conditions, the received signal will be at an acceptable level for viewing and process 100 will proceed to step 106 for normal viewing. The received signal strength is continuously checked and if it falls below an acceptable level (or if this is the first time receiver 14 is being set-up), process 100 will move to step 108 where the signal strength indication (e.g., bar graph 24) will be displayed automatically. Note that the signal strength indication which is displayed during initial set-up may contain addition antenna alignment information which is not generally displayed at other times.

Thus, a novel signal strength indicator system for a home satellite television receiver system has been disclosed. Although discussed with reference to specific embodiments and the accompanying illustrations, if should be appreciated that the present invention is applicable to a variety of signal strength and/or antenna alignment indicator systems. Accordingly, the invention should only be measured in terms of the claims which follows.

What is claimed is:

1. A home satellite television receiver, comprising:

circuitry configured to detect a received signal strength of a satellite television signal received at an antenna and to determine whether said received signal strength is above a threshold; and circuitry configured to automatically generate a visual indication that said received signal strength is below said threshold for display on a television coupled to said circuitry configured to detect.

2. The home satellite television receiver of claim 1 wherein said visual indication comprises a bar graph.

3. The home satellite television receiver of claim 1 wherein said visual indication comprises a text message.

4. A method comprising:

receiving a satellite television signal at a satellite television receiver and periodically determining a received signal strength of the satellite television signal; and determining whether the received signal strength of the satellite television signal is above a threshold and, if so, allowing normal viewing of the satellite television signal on a display device, otherwise automatically displaying on the display device an indication that the received signal strength is below the threshold.

5. The method as in claim 4 wherein the display device comprises a television set.

6. The method as in claim 5 wherein said indication comprises a bar graph.

7. The method as in claim 5 wherein said indication comprises a text message.

8. The method as in claim 5 wherein said indication is displayed over active video being displayed on said television set.

* * * * *